United States Patent
Little et al.

(10) Patent No.: US 10,459,706 B1
(45) Date of Patent: Oct. 29, 2019

(54) SYSTEM AND METHODS FOR SIMPLIFYING THREE-DIMENSIONAL MODELS

(71) Applicant: State Farm Mutual Automobile Insurance Company, Bloomington, IL (US)

(72) Inventors: Rebecca Ann Little, Gilbert, AZ (US); Nathan Carl Summers, Mesa, AZ (US); Kevin Lee Mitchell, Tempe, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 37 days.

(21) Appl. No.: 15/918,726

(22) Filed: Mar. 12, 2018

(51) Int. Cl.
*G06F 9/44* (2018.01)
*G06F 8/51* (2018.01)
*G06T 17/10* (2006.01)

(52) U.S. Cl.
CPC ............... *G06F 8/51* (2013.01); *G06T 17/10* (2013.01)

(58) Field of Classification Search
None
See application file for complete search history.

(56) References Cited

U.S. PATENT DOCUMENTS

| | | |
|---|---|---|
| 8,884,955 B1 | 11/2014 | Hsu |
| 9,373,192 B2 | 6/2016 | Wei |
| 2003/0034970 A1 | 2/2003 | Hubeli et al. |
| 2007/0220523 A1* | 9/2007 | LaFruit ............... G06F 9/5027 718/104 |
| 2008/0155494 A1* | 6/2008 | Gobel ................. G06F 8/10 717/104 |
| 2010/0257233 A1* | 10/2010 | Auvray ............... G06F 9/541 709/203 |
| 2014/0039847 A1 | 2/2014 | Georgescu et al. |
| 2015/0277719 A1* | 10/2015 | Minami ............... H04W 4/025 715/771 |
| 2015/0341518 A1* | 11/2015 | Shimizu ............... G06F 9/44 358/1.15 |
| 2017/0084079 A1* | 3/2017 | Hamada ............... G02B 27/22 |

(Continued)

OTHER PUBLICATIONS

Meshlab, "MeshLab JS 16.1 Tutorial," 2016 (Year: 2016).*

(Continued)

*Primary Examiner* — Insun Kang
(74) *Attorney, Agent, or Firm* — Faegre Baker Daniels LLP

(57) ABSTRACT

A polygon simplification computer system for performing polygon simplification within a web application pipeline has a memory device including a three-dimensional data model (3D data model), a Node.js environment, and a polygon simplification module for performing one or more polygon simplification operations on the 3D data model. The polygon simplification module has a binding component including a set of bindings that convert JavaScript into C++ source code, and a mesh simplification module comprising a C++ compiled polygon simplification framework. The polygon simplification module receives a request for the 3D data model, converts the request into a set of C++ instructions, transmits the instructions to the mesh simplification module, receives a 3D simplified data model, and transmits the 3D simplified data model to a client computing device.

20 Claims, 4 Drawing Sheets

(56) References Cited

U.S. PATENT DOCUMENTS

| | | | |
|---|---|---|---|
| 2017/0169608 A1* | 6/2017 | Starhill | G06T 17/10 |
| 2017/0228467 A1* | 8/2017 | Bailly | G06F 9/54 |
| 2018/0027264 A1* | 1/2018 | Cheung | H04L 65/4076 |
| | | | 725/115 |
| 2019/0138712 A1* | 5/2019 | Margiolas | G06F 21/53 |

OTHER PUBLICATIONS

Agafonkin, "Simplify.js," 2013 (Year: 2013).*
MeshLabJS Code Documentation, Mar. 29, 2016 (Year: 2016).*
Rwthaachen University; Open Mesh; A generic and efficient polygon mesh data structure;www.openmesh.org; accessed Sep. 26, 2018.
Jarvi, Juha; nbind; http://github.com/charto/nbind; accessed Sep. 26, 2018.

\* cited by examiner

SYSTEM AND METHODS FOR SIMPLIFYING THREE-DIMENSIONAL MODELS

FIELD

Embodiments of the invention relate generally to systems and methods for simplifying three-dimensional models, and more particularly, to systems and methods for performing polygon simplification on a 3D data model for use within a web application pipeline.

BACKGROUND

Insurance companies use various techniques and data to investigate damage or loss claims submitted by property owners. For example, after an accident or loss, a property owner typically files a claim with his or her insurance company, and in response to the claim, the insurance company may assign an appraiser to investigate the claim. The appraiser determines the extent of damage and/or loss, documents the damage, and provides the property owner with appropriate compensation.

The process for determining and documenting the extent of the damage can be inefficient and time consuming. For example, an insurance appraiser may take photos of a roof of a building to assess a claim for roof damage or multiple photos of a vehicle to assess accident damage. In some instances, the property owner may submit photos of the damaged property. Two-dimensional digital pictures or videos of a structure or vehicle, however, often provide inadequate detail for a thorough inspection of the claimed damage. Poor image quality resulting from camera movement or out-of-focus images can make it difficult to estimate the condition of a property based on an image. Even where image quality is adequate, poor angles or bad lighting may hide or exaggerate details important to estimating the condition of the structure, leading to inaccurate assessments of the structure's condition. The two-dimensional digital pictures, however, can be converted into three-dimensional models. In addition, in some instances, an appraiser or property owner may directly capture three-dimensional models of the damaged property, for example, using photogrammetry, active depth capture via infrared, and the like. The appraiser can view such three-dimensional models in a web, mobile, or desktop application via a two-dimensional display screen, a virtual reality device, or an augmented reality device.

The three-dimensional models typically generate massive polygonal or point cloud datasets. Interactive rendering of such massive geometry in web-based computer applications can be impractical due to the performance penalty for data throughput and the associated large memory storage requirements. Mesh simplification is a technology that can facilitate more performant rendering for interactive 3D applications, but such mesh simplification is not typically available in web-based development pipelines.

BRIEF DESCRIPTION OF THE INVENTION

In one aspect, a polygon simplification computer system for performing polygon simplification within a web application pipeline is provided. The computer system includes a polygon simplification server, which has a memory device including a three-dimensional data model (3D data model), a Node.js environment, and a polygon simplification module for performing one or more polygon simplification operations on the 3D data model. The polygon simplification module includes a binding component having a set of bindings that convert JavaScript into C++ source code, and a mesh simplification module including a C++ compiled polygon simplification framework. The polygon simplification module is configured to receive a request for the 3D data model from a client computing device. In addition, the polygon simplification module is configured to convert the request for the 3D data model into a set of instructions written in C++ source code and transmit the set of instructions to the mesh simplification module. Furthermore, the polygon simplification module is configured to receive, from the mesh simplification module, a 3D simplified data model, and transmit the 3D simplified data model to the client computing device.

In another aspect, a computer-implemented method for performing polygon simplification within a web application pipeline is provided. The method includes receiving, from a client computing device, a request for a 3D data model. The method also includes converting the received request into a set of instructions written in C++ source code and transmitting the set of instructions to a mesh simplification module. Furthermore, the method includes receiving, from the mesh simplification module, a 3D simplified data model, and transmitting the 3D simplified data model to the client computing device.

In yet another aspect, one or more computer-readable media having computer-executable instructions is provided. The computer-executable instructions, upon execution by a processor, cause the processor to perform operations including receiving, from a client computing device, a request for a 3D data model and converting the received request into a set of instructions written in C++ source code. In addition, the computer-executable instructions cause the processor to perform additional operations including transmitting the set of instructions to a mesh simplification module, receiving, from the mesh simplification module, a 3D simplified data model, and transmitting the 3D simplified data model to the client computing device.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

The figures described below depict various aspects of systems and methods disclosed therein. Each figure depicts an embodiment of a particular aspect of the disclosed devices and methods, and each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the figures.

The features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. The drawings are not necessarily to scale, emphasis instead being placed upon clearly illustrating the principles of the embodiments of this disclosure.

DETAILED DESCRIPTION

The following detailed description of embodiments of the disclosure references the accompanying drawings. The embodiments are intended to describe aspects of the disclosure in sufficient detail to enable those skilled in the art to practice the disclosure. Other embodiments can be utilized and changes can be made without departing from the scope of the claims. The following detailed description is, therefore, not to be taken in a limiting sense. The scope of the present disclosure is defined only by the appended claims, along with the full scope of equivalents to which such claims are entitled.

The present embodiments described in this disclosure and other possible embodiments address the need for reducing the size and complexity of 3D models, and more specifically, for simplifying and/or smoothing 3D models for use by web-based technologies and/or in web-based environments.

Embodiments of the present invention include one or more client computing devices coupled to a polygon simplification sever system via a network, such as the Internet. The polygon simplification sever system receives a request for a 3D data model from one of the client computing devices. The request for the 3D data model is routed through a polygon simplification Node.js module where JavaScript input is converted to C++ source code instructions for instructing a C++ polygon simplification framework to load and simplify the 3D data model. The polygon simplification framework then outputs and transmits a simplified 3D data model to the requesting client computing device. As such, the polygon simplification Node.js module facilitates calling a C++ polygon simplification library effortlessly from JavaScript without changes to the native C++ polygon simplification library.

Exemplary Polygon Simplification System

Figure 1:
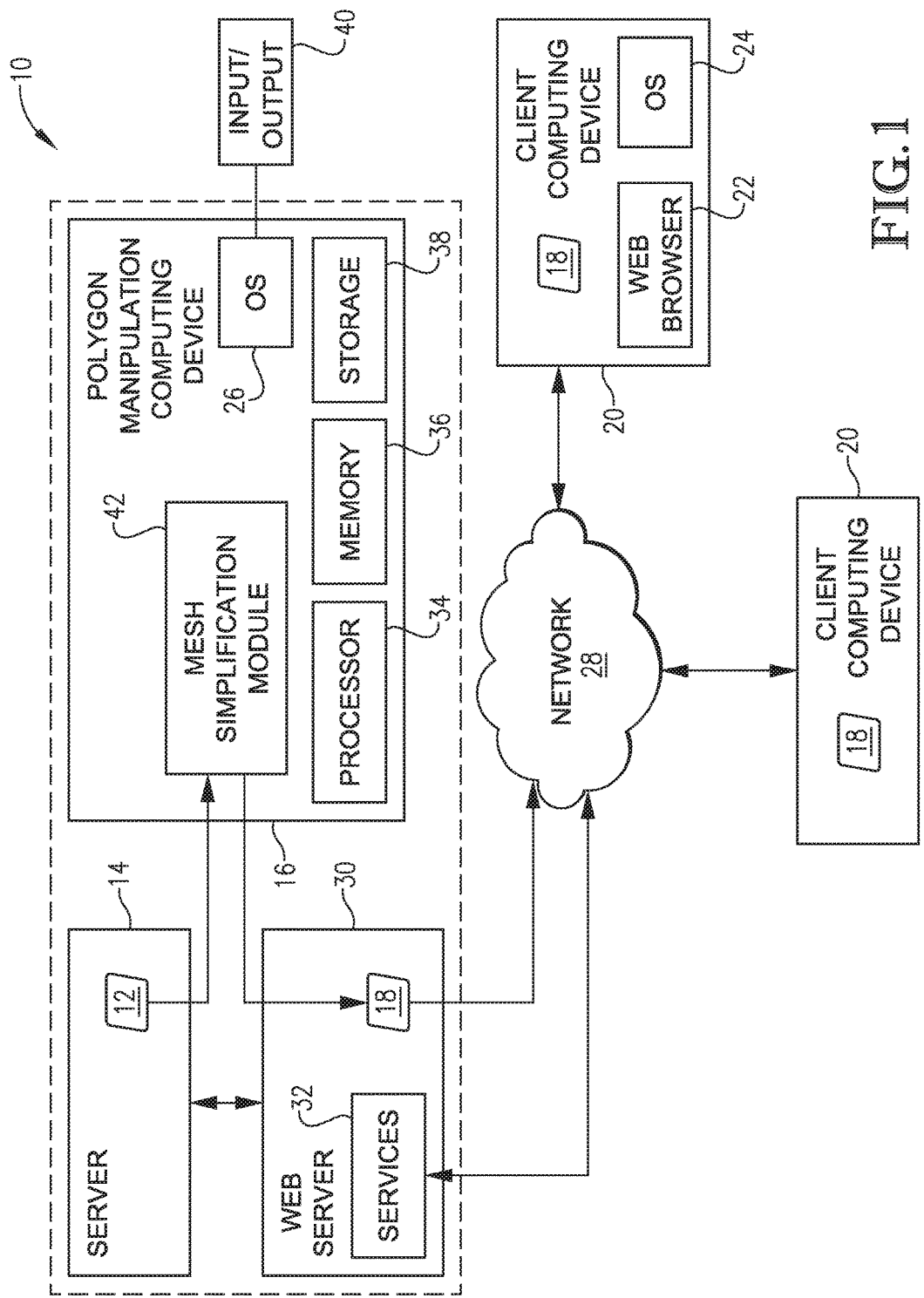
FIG. 1 is an exemplary polygon simplification computer system.

FIG. 1 is an exemplary polygon simplification computer system 10. The computer system 10, and/or portions thereof, can be implemented by one or more computing devices and can be implemented by software, hardware, firmware, and/or any combination thereof. Furthermore, in some embodiments, the computer system 10 may include additional, fewer, or alternative devices, including those described elsewhere herein. The computing devices illustrated in FIG. 1 may be conventional computing devices, although other embodiments may have different configurations, architectures, and/or components. In addition, in the embodiments described herein, implementations of the computer system 10 are described in the context of one or more computing devices configured to perform various operation, methods, and/or functions in accordance with aspects of the disclosure. The computer system 10 includes a combination of hardware and software. Generally, the computer system 10 can include one or more processors, memory devices, various input and/or output devices, communication interfaces, and/or other types of devices. In the embodiments described herein, the computer system 10 includes a processor configured to execute computer-executable instructions and a computer-readable medium (e.g., a memory device and/or additional hardware storage) for storing the computer-executable instructions configured to perform the various operations, methods, and/or functions in accordance with aspects of the disclosure.

The computer system 10 can be implemented as a distributed computer system in which components are located on different computing devices that are connected to each other through a network (e.g., wired and/or wireless) and/or other forms of direct and/or indirect data connections. For example, the computer system 10 can use redundant and/or geographically dispersed datacenters. In addition, the computer system 10 can provide hosted and/or cloud-based services. The computer system 10 can be implemented by physical server systems of a datacenter that provide shared computing and storage resources and that host virtual machines having various roles for performing different tasks in conjunction with providing cloud-based services.

In the exemplary embodiment, a three-dimensional data model 12 (3D data model) is provided, for example by a polygon simplification server 14 where it has been previously stored. The 3D data model 12 may be intended for various purposes, but in the computer system 10 it is a 3D data model of a claimant's insured property that is intended for display and/or use on one or more of a plurality of client computing devices 20 (e.g., a model of a damage vehicle, home, personal property, etc.). The server 14 can be configured to provide various types of services and/or data stores in accordance with various aspects of the disclosure. Example server system computing devices can include, for example, and without limitation, web servers, front end servers, application servers, database servers (e.g., SQL servers), domain controllers, domain name servers, directory servers, and/or any other suitable computing devices. As described herein, the server 14 can be implemented, for example, and without limitation, as a virtual machine.

A client computing device 20 may include, for example, and without limitation, personal computers, smart phones, tablet computers, or any other suitable computing devices. In general, each client computing device 20 includes an operating system 24 for providing services to software components running on the client computing device 20 such as a web browser 22.

The 3D data model 12 may be delivered to a polygonal manipulation computing device 16 where it is transformed into a 3D simplified data model 18. The 3D simplified data model 18 is transmitted to the client computing device 20 in various forms, but typically may be in the form of a computer-generated mesh produced after performing mesh simplification operations, e.g. polygonal simplification, decimation, smoothing, etc., on the 3D data model 12 by the polygonal manipulation computing device 16. Computer-generated meshes, such as the 3D data model 12 and the 3D simplified data model 18, constitute visual representations of three-dimensional surfaces, for example, and without limitation, of objects such as a claimant's insured property described above. It is to be appreciated that the output, such as the 3D simplified data model 18, can be produced by the computer system 10 or other suitable computer systems. For example, and without limitation, the computer system 10, and in particular, the client computing device 20, can display visual representations of the 3D simplified data model 18 received from the polygonal manipulation computing device 16.

The 3D simplified data model 18 may typically be delivered to the one or more client computing devices 20 over a data network 28 such as the Internet by a remote web server 30, although other delivery and installation arrangements may be used. The web server 30, or one or more equivalent server systems, may also provide data, support, digital rights management, and/or other services 32 to the client computing devices 20 and in particular to the web browser 22 executing on the client computing devices 20.

In one suitable embodiment, the 3D data model 12 and/or the 3D simplified data model 18 may be vulnerable to copying and/or compromise in various ways on the server 14, web server 30, and/or client computing device 20. For example, the 3D data model 12 and/or the 3D simplified data model 18 may implement digital rights management techniques which an attacker may try to compromise by extracting an encryption key or details of an algorithm which can enable future circumvention of the digital rights management techniques for the 3D data model 12 and/or the 3D simplified data model 18. Such digital rights techniques could be implemented in the server 14, the web server 30, in a development environment (not shown), or elsewhere in the computer system 10.

In the exemplary embodiment, the polygonal manipulation computing device 16 performs a mesh simplification process on an input model, such as the 3D data model 12, and generates an output mesh, such as the 3D simplified data model 18, for delivery to the client computing device 20. The mesh simplification process is executed by a mesh simplification module 42 (a C++ compiled polygon simplification framework) on the polygonal manipulation computing device 16 under the control of an operating system 26. The polygonal manipulation computing device 16 typically includes one or more processors 34 that execute the mesh simplification process of the mesh simplification module 42 using a memory device 36. In some embodiments, a user can control the polygonal manipulation computing device 16 through an input/output device 40. The polygonal manipulation computing device 16 and functionality of the mesh simplification module 42 may be distributed across a plurality of computing devices coupled in communication with each other by one or more suitable network connections. In the exemplary embodiment, at least a portion of the software used to provide the mesh simplification process may be stored in a data storage device 38, in one or more computer readable media, such as the memory device 36, and/or may be transmitted over a data network to the polygonal manipulation computing device 16.

While described herein as separate computing devices, it is noted that the server 14, the polygonal manipulation computing device 16, and the web server 30 may be may be implemented in one or more computing devices. For example, and without limitation, in one embodiment, the server 14 and the polygonal manipulation computing device 16 may be implemented in one computing device that communicates with a separate web server 30. In another, embodiment, the server 14, the polygonal manipulation computing device 16, and the web server 30 may be implemented in a single computing device, wherein the polygonal manipulation computing device 16 and the web server 30 may be implemented by software, hardware, firmware, and/or any combination thereof, as is described above.

Exemplary Computing Device

Figure 2:
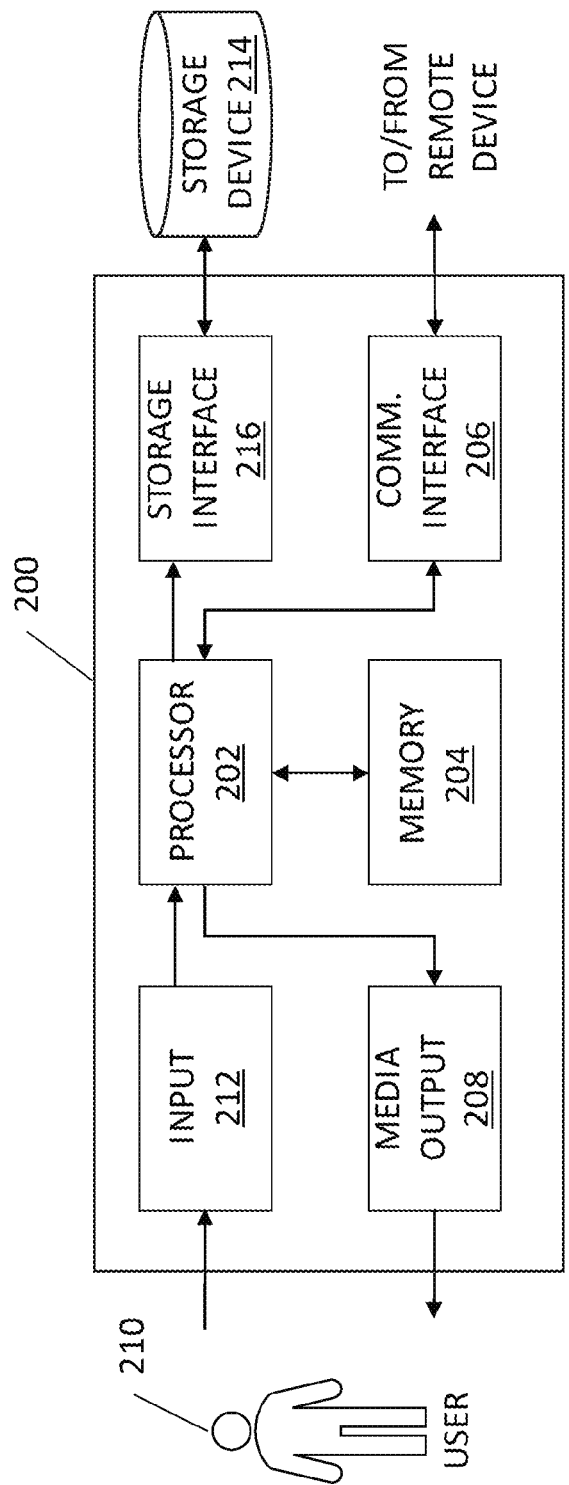
FIG. 2 is a schematic of an exemplary computing device that may be used with the polygon simplification computer system shown in FIG. 1.

FIG. 2 is a schematic of an exemplary computing device 200. The computing device 200 may include, but is not limited to, the server 14, the polygonal manipulation computing device 16, the client computing device 20, and/or the web server 30 (each shown in FIG. 1). The computing device 200 may include a processor 202 for executing instructions. The instructions may be stored in a memory 204. The processor 202 may include one or more processing units (e.g., in a multi-core configuration). The processor 202 may be operatively coupled to a communication interface 206 such that, for example, the client computing device 20 can communicate with one or more remote devices, such as the server 14, the polygonal manipulation computing device 16, the web server 30, and/or another computing device (not shown), for example, using wireless communication or data transmission over one or more radio links or digital communication channels. For example, in some embodiments, the communication interface 206 may transmit a request for and/or receive the 3D simplified data model 18 (shown in FIG. 1).

The memory 204 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, and/or combinations thereof. In some embodiments, the memory 204 may be embedded in, or packaged in the same package as, the processor 202. The memory 204 may include, or may constitute, a "computer-readable medium." The memory 204 may store the instructions, code, code segments, software, firmware, programs, applications, apps, services, daemons, or the like that are executed by the processor 202. The memory 204 may also store settings, data, documents, databases, system logs and the like.

The computing device 200 may also include at least one media output component 208 for presenting information to, for example, a user 210. The media output component 208 may be any component capable of conveying information to the user 210. In some embodiments, the media output component 208 may include an output adapter (not shown) such as a video adapter and/or an audio adapter. The output adapter may be operatively coupled to the processor 202 and operatively coupleable to an output device such as a display device (e.g., a cathode ray tube (CRT), liquid crystal display (LCD), light emitting diode (LED) display, organic LED (OLED), or "electronic ink" display) and/or an audio output device (e.g., a speaker or headphones). In some embodiments, the media output component 208 may be configured to present a graphical user interface (e.g., a web browser and/or a client application) to the user 210. A graphical user interface may include, for example, an interface for viewing prompts, status messages, and the like.

In some embodiments, the computing device 200 may include an input device 212 for receiving input from the user 210. The input device 212 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 208 and the input device 212.

Furthermore, in some embodiments, the processor 202 may be operatively coupled to a storage device 214 via a storage interface 216. The storage interface 216 may be any component capable of providing the processor 202 with access to the storage device 214. The storage interface 216 may include, for example, and without limitation, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access the to the storage device 214.

The storage device 214 may be any computer-operated hardware suitable for storing and/or retrieving data, such as, but not limited to, data associated with the server 14 (shown in FIG. 1). In some embodiments, the storage device 214 may be integrated into, for example, the server 14, the webserver 30, and/or the client computing device 20. For example, the computing device 200 may include one or more hard disk drives or other memory component that functions as the storage device 212.

In some embodiments, the storage device 214 may be external to the computing device 200 and may be accessed by one or more computing devices, such as the server 14, the polygonal manipulation computing device 16, the client computing device 20, and/or the web server 30. For example, the storage device 214 may include a storage area network (SAN), a network attached storage (NAS) system, and/or multiple storage units such as hard disks and/or solid-state disks in a redundant array of inexpensive disks (RAID) configuration.

The processor 202 may execute computer-executable instructions for implementing aspects of the disclosure. In some embodiments, the processor 202 may be transformed into a special purpose microprocessor by executing computer-executable instructions or by otherwise being programmed. For example, the processor 202 may be programmed with instructions such as those illustrated in FIG. 4.

Exemplary Polygon Simplification Module

Figure 3:
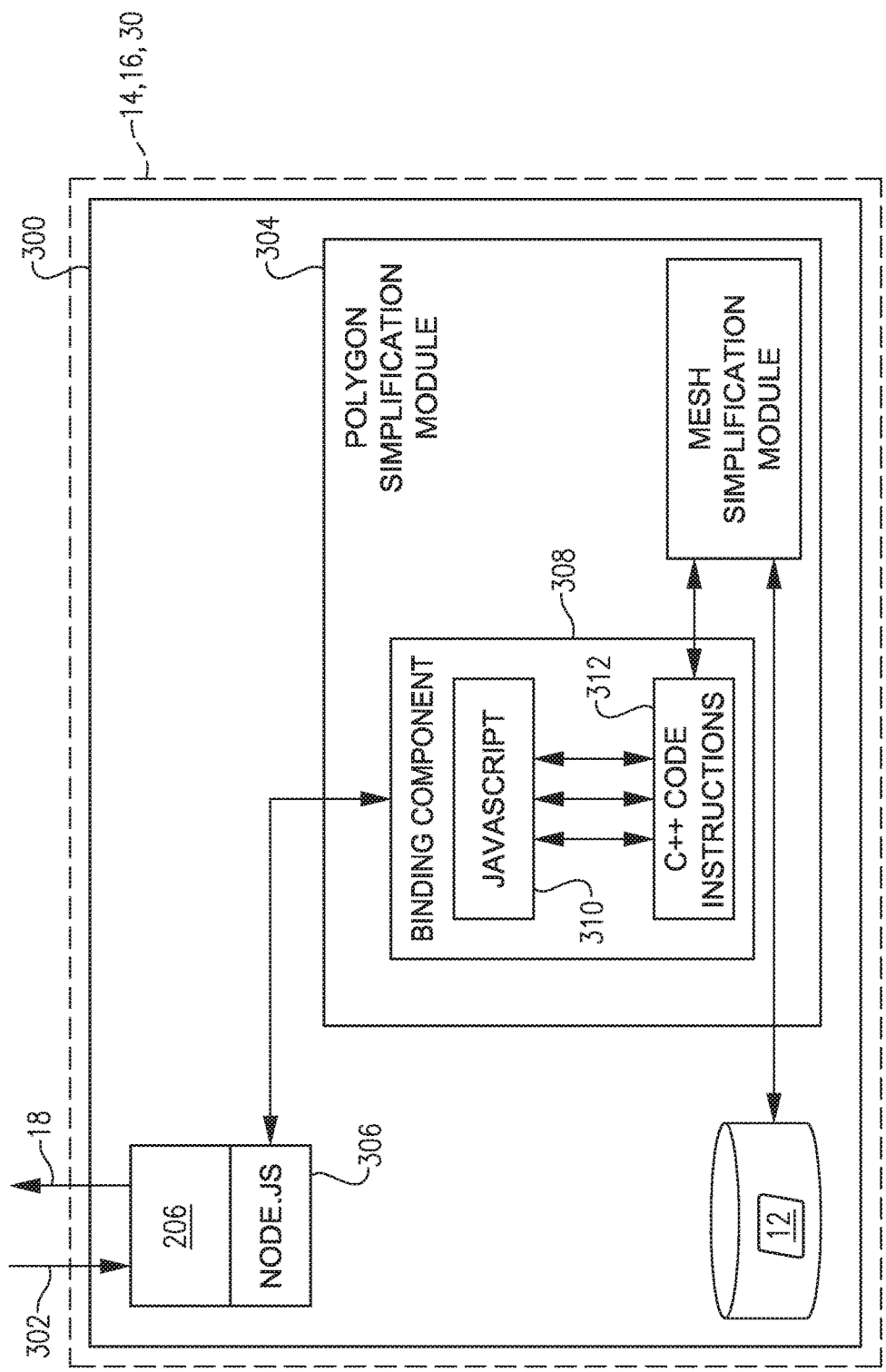
FIG. 3 is a schematic of software components of a computer server of the polygon simplification computer system shown in FIG. 1, and for performing polygon simplification on a 3D data model.

FIG. 3 is a schematic of software components 300 of the server 14 for performing polygon simplification on the 3D data model 12. The software components 300 may be executed by a processor, such as the processor 34 (shown in FIG. 2). In the exemplary embodiment, the server 14 and in particular, the web server 30 may be configured to receive a request to provide or transmit the 3D data model 12 to a requesting computing device, such as the client computing device 20 (shown in FIG. 2) for viewing in a web browser and/or by a virtual reality (VR) device coupled to the client computing device 20. The 3D data model 12, however, may be a large file that cannot be rendered or displayed at a sufficiently high enough rendering rate to provide a satisfactory user experience.

Rendering rate includes, for example, an amount of data rendered per amount of time, e.g., the rendering rate may be measured as pixels rendered per second (e.g., pixel rendering rate), bits rendered per second (e.g., bit rendering rate), a frame rate or frame rendering rate (e.g., frames per second), or any other rendering performance measurement that enables the server 14 to function as described herein. If the rendering rate is insufficient or does not achieve a minimal (or threshold) rendering rate, significant latency or lag may be experienced by a user who is viewing or experiencing the 3D data model 12 in an interactive 3D application. This can result in the user experiencing a significant lag or latency in changes or updates to the displayed 3D data model 12 in response to user motion or actions. In some cases, significant latency in the rendering of the 3D data model 12 can cause motion sickness or nausea by the user, especially if the application is being viewed or experienced in a VR environment. As such, in the exemplary embodiment, the software components 300 of the server 14 include a polygon simplification module 304 (i.e., a Node.js module) configured to simplify the 3D data model 12 into a smaller 3D simplified data model 18 to facilitate improving the rendering rate of the model. In the exemplary embodiment, the rendering rate of the 3D simplified data model 18 may be in the range between and including about 60 frames per second and about 90 frames per second. The rendering rate of the 3D data model 12, prior to polygon simplification operations, may be less than about 60 frames per second.

In the exemplary embodiment, the server 14 includes the communication interface 206 as described herein, which connects the server 14 to other computing devices, such as the client computing device 20. Preferably, the communication interface 206 has a Node.js environment 306 connected to or integral with it. Node.js is a JavaScript runtime environment for executing JavaScript code on the server-side of a typical client/server relationship. Historically, JavaScript was used for client-side scripting, in which scripts written in JavaScript were embedded in a webpage's code to be run client-side by a JavaScript engine in the client-side web browser. Node.js enables JavaScript to be used for server-side scripting. For example, Node.js facilitates developers to incorporate the functionality of JavaScript code modules known as "node packaged modules" (also referred to herein as "Node.js modules") by simply referencing such modules in their source code files.

In the exemplary embodiment, the polygon simplification module 304 (i.e., the Node.js module) may include at least a portion of JavaScript and run on a Windows operating system (OS), an Apple OS, or a Linux OS. The polygon simplification module 304 includes a binding component 308 that includes a set of bindings or headers 310 that facilitate converting JavaScript to C++ code 312, thereby facilitating making C++ libraries accessible from JavaScript. The binding component 308 typically is an application programming interface (API) that provides glue code to use a library or service in a given programming language, for example using a C++ library in JavaScript. Binding generally refers to wrapper libraries that bridge two programming languages, so that a library written for one language (e.g., C++) can be used in another language (e.g., JavaScript).

In the exemplary embodiment, the C++ code 312 includes a set of instructions written in C++ source code and includes identifying the 3D data model 12 stored, for example, in a memory device 314, that is to be read by the mesh simplification module 42. In addition, the set of instructions may include any user specified arbitrary traits for vertices, edges, and faces or set of predefined attributes to be propagated to the mesh simplification module 42, and instructions for writing the 3D simplified data model 18, which may be transmitted, for example, to the client computing device 20 and/or stored in the memory device 314. The memory device 314 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, and/or combinations thereof.

In the exemplary embodiment, the mesh simplification module 42 may decompose an input model or mesh, such as the 3D data model 12, into geometrically separate component meshes, each of which can be simplified to reduce the number of polygonal faces or triangles in each component mesh. The simplified component meshes can be reassembled into a combined, simplified mesh, such as the 3D simplified data model 18. The mesh simplification module 42 may include, for example, and without limitation, a mesh generation module 44, a mesh decimation module 46, and a mesh smoothing module 48. The mesh generation module 44 can be configured and utilized to generate a mesh that represents a 3D model surface from the 3D data model 12 defined by a set of data including, for example, and without limitation, point cloud data. The mesh generation module 44 can produce an input mesh that represents the three-dimensional model surface as polygons (i.e., faces or triangles) interconnected by vertices and edges. The mesh decimation module 46 can be configured and utilized to decompose the 3D data model 12 into a plurality of component meshes. The mesh smoothing module 48 can be configured and utilized to improve the mesh surface quality, remove noise, and/or preserve sharp features of the 3D data model 12.

Figure 4:
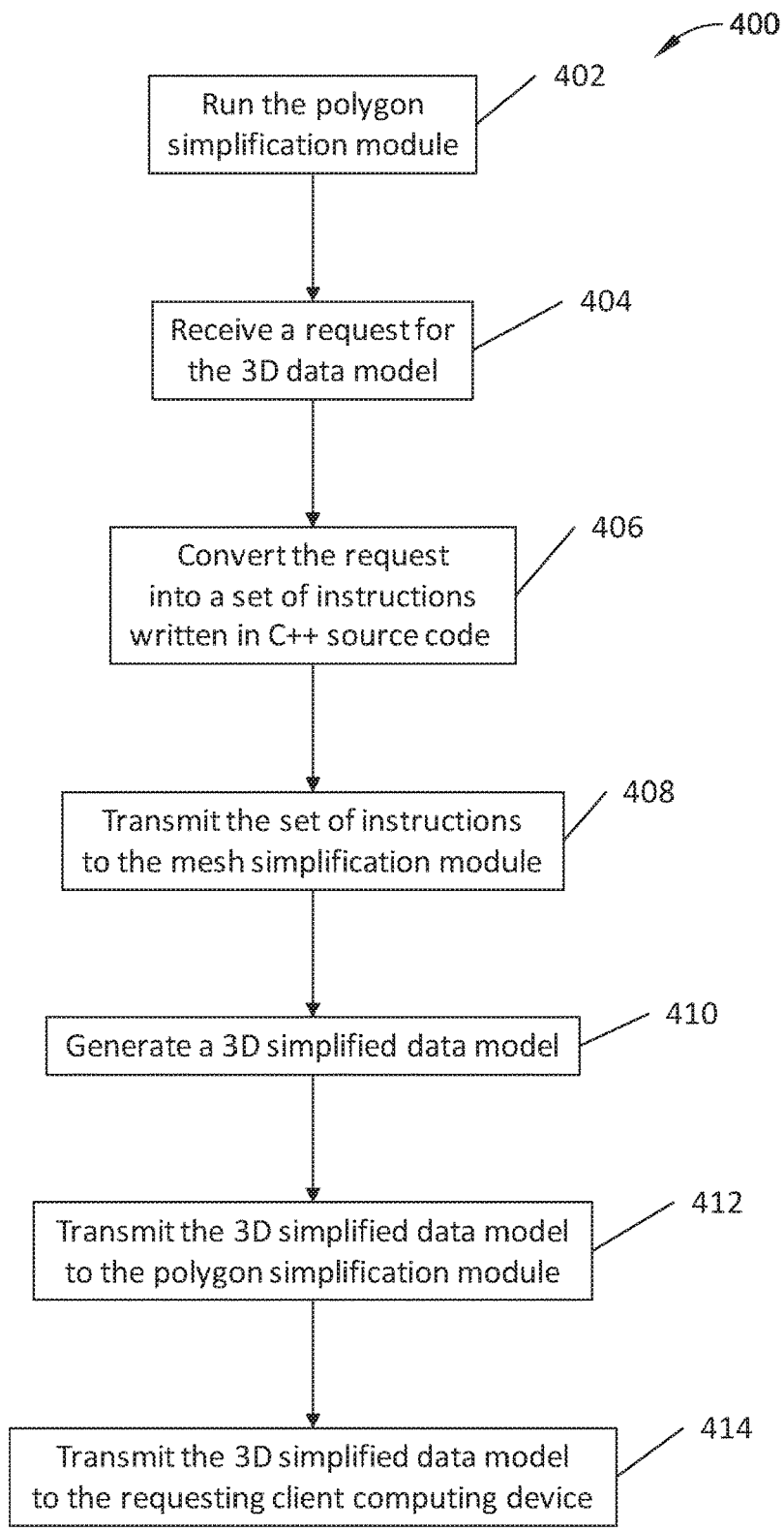
FIG. 4 is a flow diagram of an exemplary method for performing polygon simplification within a web application pipeline and that may be used with the polygon simplification computer system shown in FIG. 1.

Exemplary Computer-Implemented Method for Performing Polygon Simplification within a Web Application Pipeline FIG. 4 is a flow diagram of an exemplary method 400 for performing polygon simplification within a web application pipeline and that may be used with the polygon simplification computer system 10 (shown in FIG. 1). The method 400 may be at least partially performed by the server 14 (shown in FIG. 1). In certain embodiments, the method 400 may be at least partially performed by another computing device, such as the polygonal manipulation computing device 16 (shown in FIG. 1) and/or the web server 30 (shown in FIG. 1). However, a person having ordinary skill will appreciate that responsibility for all or some of such actions may be distributed differently among such devices or other computing devices without departing from the spirit of the present invention. The method 400 may include additional, fewer, or alternative operations, including those described elsewhere herein. The various operations or set of operations may be performed in parallel with other operations, either in a synchronous or asynchronous manner. In addition, some operations may be optional.

A computer-readable medium may also be provided. The computer-readable medium may include an executable program stored thereon, wherein the program instructs one or more processors to perform one or more of the operations outlined herein. The program stored on the computer-readable medium may instruct the processor to perform additional, fewer, or alternative actions, including those discussed elsewhere herein.

In the exemplary embodiment, the method 400 is a method by which a C++ framework, API, and/or library, such as the mesh simplification module 42 (shown in FIG. 1), may be easily consumable (e.g., run and/or executed) in a web-based environment. Typically, C++ libraries are not callable or accessible from JavaScript, for example, that may be run in the Node.js environment 306 (shown in FIG. 3). In the exemplary embodiment, the mesh simplification module 42, however, includes at least one native C++ library and a binding component to facilitate access or calls from JavaScript, thereby facilitating platform independent execution, such as in a web-based environment or the Node.js environment 306.

With respect to FIGS. 1-4, the method 400 may begin with the server 14 and in particular, the web server 30 running 402 the polygon simplification module 304 within Node.js as a platform independent JavaScript application so it is accessible from the client computing devices 20 via a web browser, such as the web browser 22 (shown in FIG. 1). The polygon simplification module 304 receives 404 a request from one or more of the client computing devices 20 for the 3D data model 12. The requesting client computing device 20 requests the 3D data model 12 for display of the model, for example, in a web browser, such as the web browser 22 (shown in FIG. 1), via a 2D display, or via a VR or AR device (e.g., a VR headset) coupled to the client computing device 20.

In the exemplary embodiment, the client computing devices 20 may utilize a web-based virtual reality API, such as WebVR, to display the requested 3D model to the user. WebVR is a JavaScript API that leverages the browser-based graphics library to run VR applications. Because WebVR is web-based and utilizes browser-based graphics, performance is important to provide an adequate user experience. Notable issues are the loading time and rendering speed of large files, such as the 3D data model 12. Also, because WebVR is a JavaScript API, the technology stack for WebVR development does not include support for accessing and/or running native C++ applications.

The polygon simplification module 304 may convert 406 the request for the 3D data model 12 into the set of instructions 312 written in C++ source code and transmit 408 the set of instructions 312 to the mesh simplification module 42. The instructions 312 are in the form of C++ source code and may include, for example, and without limitation, identifying information for the 3D data model 12 stored, for example, in the memory device 314. In some embodiments, the user may also specify arbitrary traits for vertices, edges, and faces or a set of predefined attributes to be propagated to the mesh simplification module 42. In such embodiments, the instructions 312 include these additional traits or attributes. In the exemplary embodiment, the instructions 312 also include information for writing the 3D simplified data model 18.

After receiving the set of instructions 312, the mesh simplification module 42 may simplify and/or smooth the 3D data model 12. In addition, in some embodiments, where the 3D data model 12 consists of point cloud data and the like, the mesh simplification module 42 may generate a 3D mesh model from the data prior to simplifying and/or smoothing the data.

After the mesh simplification module 42 processes (i.e., simplifies and/or smooths) the 3D data model 12, the mesh simplification module 42 may generate 410 the 3D simplified data model 18 from the processed data and transmit 412 it to the polygon simplification module 304. In one suitable embodiment, the 3D simplified data model 18 may be subsequently written to the memory device 314 for future access from one or more of the client computing devices 20. In the exemplary embodiment, the method 400 includes transmitting 414 the 3D simplified data model 18 to the requesting client computing device 20.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As will be appreciated based upon the foregoing disclosure, the above-described embodiments may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Certain embodiments are described herein as including logic or a number of routines, subroutines, applications, or instructions. These may constitute either software (e.g., code embodied on a machine-readable medium or in a machine-readable signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as an FPGA, to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the terms "processor," "processing element," or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A polygon simplification computer system for performing polygon simplification within a web application pipeline, said system comprising:
    a polygon simplification server comprising:
        a memory device including a three-dimensional (3D) data model;
        a Node.js environment; and
        a polygon simplification module running within the Node.js environment for performing one or more polygon simplification operations on the 3D data model, said polygon simplification module comprising:
            a binding component comprising a set of bindings that convert JavaScript code into C++ source code; and
            a mesh simplification module comprising a C++ compiled polygon simplification framework, said polygon simplification module configured to:
                receive a request in JavaScript for the 3D data model from a client computing device;
                convert the request for the 3D data model into a set of instructions written in C++ source code via the binding component;
                transmit the set of instructions to the mesh simplification module to instruct the C++ compiled polygon simplification framework to load and simplify the 3D data model by decomposing the 3D data model into a plurality of geometrically separate component meshes, reducing the number of polygonal faces or triangles in each mesh, and reassembling the meshes into a 3D simplified data model;
                receive, from the mesh simplification module, the 3D simplified data model; and
                transmit the 3D simplified data model to the client computing device.

2. The polygon simplification computer system in accordance with claim 1, further comprising a web server, said web server coupled in communication with the client computing device.

3. The polygon simplification computer system in accordance with claim 2, wherein the web server is implemented in the polygon simplification server.

4. The polygon simplification computer system in accordance with claim 1, wherein the request for the 3D data model includes one or more user specified arbitrary traits for vertices, edges, and faces of the 3D data model to be propagated to the mesh simplification module.

5. The polygon simplification computer system in accordance with claim 1, wherein the request for the 3D data model includes a set of predefined attributes to be propagated to the mesh simplification module.

6. The polygon simplification computer system in accordance with claim 1, further comprising a communication interface coupled in communication to said Node.js environment, said communication interface configured to receive the request for the 3D data model and transmit the 3D simplified data model to one or more remote devices.

7. The polygon simplification computer system in accordance with claim 1, said polygon simplification module further configured to store the 3D simplified data model in said memory device.

8. The polygon simplification computer system in accordance with claim 1, wherein said mesh simplification module is configured to smooth the 3D data model to generate the 3D simplified data model.

9. The polygon simplification computer system in accordance with claim 8, wherein said mesh simplification module is further configured to generate a 3D mesh model from the 3D data model.

10. A computer-implemented method for performing polygon simplification within a web application pipeline, said method comprising:
   receiving a request in JavaScript for a three-dimensional (3D) data model from a client computing device in a Node.js environment;
   converting the request for the 3D data model into a set of instructions written in C++ source code;
   transmitting the set of instructions to a mesh simplification module to instruct a C++ compiled polygon simplification framework to load and simplify the 3D data model by decomposing the 3D data model into a plurality of geometrically separate component meshes, reducing the number of polygonal faces or triangles in each mesh, and reassembling the meshes into a 3D simplified data model;
   receiving, from the mesh simplification module, the 3D simplified data model; and
   transmitting the 3D simplified data model to the client computing device.

11. The computer-implemented method in accordance with claim 10, wherein receiving the request comprises receiving identifying information for the 3D data model.

12. The computer-implemented method in accordance with claim 11, wherein receiving the request further comprises receiving one or more user specified arbitrary traits for vertices, edges, and faces of the 3D data model to be propagated to the mesh simplification module.

13. The computer-implemented method in accordance with claim 11, wherein receiving the request further comprises receiving a set of predefined attributes to be propagated to the mesh simplification module.

14. The computer-implemented method in accordance with claim 10, further comprising smoothing the 3D data model to generate the 3D simplified data model.

15. The computer-implemented method in accordance with claim 14, further comprising generating a 3D mesh model from the 3D data model prior to and the smoothing.

16. The computer-implemented method in accordance with claim 10, further comprising retrieving the 3D data model from a memory device.

17. The computer-implemented method in accordance with claim 10, further comprising storing the 3D simplified data model in a memory device.

18. Non-transitory computer-readable media having computer-executable instructions, which upon execution by a processor, cause the processor to perform operations comprising:
   receiving a request in JavaScript for a three-dimensional (3D) data model from a client computing device in a Node.js environment;
   converting the request for the 3D data model into a set of instructions written in C++ source code;
   transmitting the set of instructions to a mesh simplification module to instruct a C++ compiled polygon simplification framework to load and simplify the 3D data model by decomposing the 3D data model into a plurality of geometrically separate component meshes, reducing the number of polygonal faces or triangles in each mesh, and reassembling the meshes into a 3D simplified data model;
   receiving, from the mesh simplification module, the 3D simplified data model; and
   transmitting the 3D simplified data model to the client computing device.

19. The computer-readable media in accordance with claim 18, wherein the computer-executable instructions further cause the processor to perform smoothing the 3D data model to generate the 3D simplified data model.

20. The computer-readable media in accordance with claim 18, wherein the computer-executable instructions further cause the processor to perform generating a 3D mesh model from the 3D data model prior to performing the smoothing.

* * * * *